(12) United States Patent
Kim

(10) Patent No.: US 6,559,617 B2
(45) Date of Patent: May 6, 2003

(54) METHOD FOR REDUCING TORQUE RIPPLE OF SWITCHED RELUCTANCE MOTOR

(75) Inventor: Sang Young Kim, Seoul (KR)

(73) Assignee: LG Electronics, Inc., Seoul (KR)

( * ) Notice: Subject to any disclaimer, the term of this patent is extended or adjusted under 35 U.S.C. 154(b) by 44 days.

(21) Appl. No.: 09/962,075

(22) Filed: Sep. 26, 2001

(65) Prior Publication Data

US 2002/0109476 A1 Aug. 15, 2002

(30) Foreign Application Priority Data

Feb. 13, 2001 (KR) .................................. 2001-0007077

(51) Int. Cl.$^7$ ............................................... H02P 1/46
(52) U.S. Cl. ................. 318/701; 318/432; 318/439; 318/599; 388/811
(58) Field of Search ................. 318/432, 439, 318/254, 138, 599, 701; 388/811, 812

(56) References Cited

U.S. PATENT DOCUMENTS 5,780,986 A * 7/1998 Shelton et al. .............. 318/432
6,002,226 A * 12/1999 Collier-Hallman et al. . 318/439
6,448,724 B1 * 9/2002 Kleinau et al. .............. 318/254

* cited by examiner

Primary Examiner—Karen Masih
(74) Attorney, Agent, or Firm—Fleshner & Kim, LLP

(57) ABSTRACT

A method for reducing a torque ripple of a Switched Reluctance Motor for detecting a position of the rotor using a position detection sensor, designing a pulse width if a position detection signal as an optimum one and decreasing a torque ripple of the motor by adjusting a duty rate of the pulse width modulation signal comprises the steps of setting a pulse width of a position detection signal in accordance with a position detection result of a motor rotor, outputting a signal for controlling of each phase in synchronization with a rising and falling edge of the position detection signal, and varying and outputting a duty rate of a pulse width modulation signal from the moment that a falling edge of the position detection signal is detected thus to have advantage of decreasing more than fifty percents of the torque ripple.

5 Claims, 7 Drawing Sheets

METHOD FOR REDUCING TORQUE RIPPLE OF SWITCHED RELUCTANCE MOTOR

BACKGROUND OF THE INVENTION

1. Field of the Invention

The present invention relates to a method for reducing a torque ripple of a Switched Reluctance Motor (SRM) and particularly, to a method for reducing a torque ripple of a SRM, which detects the position of a rotor of a motor using a position detection sensor and reduces the torque ripple of the motor by designing the optimum pulse width of the position detecting signal and adjusting the duty rate of the pulse width modulation signal.

2. Description of the Background Art

Generally, a position signal of a motor rotor is required to drive a SRM (hereinafter as motor) and the motor can be controlled in the normal/reverse direction by recognizing a normal/reverse turning point of rotation accurately with a minimum one position sensor.

FIG. 1 is a block diagram showing a motor in accordance with the conventional art. As shown in the drawing, a conventional motor is comprised of three position detection sensors 301, 302 and 303 for detecting position of a motor rotor, pulse width modulation signal 110, a main controlling unit 100 for controlling three phase signals 120, 130 and 140 and the position detection sensors 301, 302 and 303, a motor driving unit 50 for inputting the three phase electric current to the motor by the three phase signal inputted from the main controlling unit 100, and a motor 200 driven by the three phase electric current inputted from the motor driving unit 50. Reference numerals 115, 125 and 135 designate AND gates.

FIG. 2 shows respective wave form charts of signals outputted from FIG. 1 and FIG. 3 is a wave form chart of a torque ripple in accordance with the conventional art.

With reference to FIGS. 1, 2 and 3, description of driving of the motor according to the conventional art is as follows.

The position detection sensors 301, 302 and 303 input the position detection signals 150, 160 and 170 to the main controlling unit 100 by detecting the rotor position of the motor. According to the detection result of the sensors the pulse width modulation signal 110 outputted from the main controlling unit 100 and the three phase signals 120, 130 and 140 are computed by a logical AND operation and then inputted to the motor driving unit 50. The motor driving unit 50 inputs electric current into each phase according to the signals inputted from the main controlling unit 100.

Wave forms of respective signals according to rotation of the motor 200 are shown in FIG. 2. Firstly, in the wave forms of respective phases, the position detection signal is on for a certain time, for example, a time duration that the rotor of motor rotates fifteen degrees of a mechanical angle (hereinafter the mechanical angle will be omitted) whenever the respective sensor in a rising edge of respective detection signals and the respective signals are inputted to the motor driving unit after performing logical AND operation with the pulse width modulation signal 110. The calculated signals controls the three phase electric current of the motor driving unit and electric current of respective phase of the motor driving unit 50 is inputted to the motor 200.

Namely, if the first sensor 301 is turned on, A phase signal of 120 in the rising edge of the first position detection signal 150 becomes ON. The signal of phase A is inputted to the motor driving unit 50 after performing a logical AND operation with the pulse width modulation signal 110 and the motor driving unit 50 inputs the A phase electric current to the motor according to the control of the signal. At this time, the motor 200 starts to rotate and after a certain time duration (for example, a time that the motor rotor rotates fifteen degrees) and if the second sensor 302 is turned on, the B phase signal 130 is turned on in the rising edge of the second position detection signal 160. The B phase signal 130 is inputted to the motor driving unit 50 after performing logical AND operation with the pulse width modulation signal 110 and the motor driving unit 50 inputs the B phase electric current to the motor 200 according to control of the signal.

Later, if the second sensor 302 is turned off, the A phase signal 120 becomes OFF in a falling edge of the second position detection signal and if the third sensor is turned on after a certain time period, a C phase signal 140 in the rising edge of the third position detection signal 170. The signal is inputted to te motor driving unit after performing a logical AND operation with the pulse width modulation signal 110 and the motor driving unit 50 inputs the C phase electric current to the motor according to the control of the signal.

If the third sensor 303 is turned off, the B phase signal 130 becomes OFF in the falling edge of the third position detection signal. If the first sensor 301 is turned on after a certain time period, the A phase signal 120 becomes ON in the rising edge of the first position detection signal 150 and the C phase signal 140 becomes OFF in the falling edge of the first detection signal.

According to the above process, signals of respective phase signals and the pulse width modulation signal 110 are inputted to the motor driving unit 50 after performing logical AND operations respectively. In addition, the motor driving unit 50 inputs electric current of each phase to a stator coil and the motor 200 rotates in the above pattern.

At this time, a torque which is a sum of respective torques is generated by the three phase electric current inputted to the motor and a torque ripple as shown in FIG. 3 is generated. In FIG. 3, a horizontal axis designates a rotational angle and a vertical axis designates a size of the torque ripple.

The driving method of the motor in the conventional art has a disadvantage that much amount of noise is generated due to much amount of the torque ripple.

SUMMARY OF THE INVENTION

Therefore, an object of the present invention is to provide a method for reducing a torque ripple of an SRM for detecting a position of the rotor using a position detection sensor, designing a pulse width if a position detection signal as an optimum one and decreasing the torque ripple of the motor by adjusting a duty rate of the pulse width modulation signal.

To achieve these and other advantages and in accordance with the purpose of the present invention, the present invention comprises the steps of setting a pulse width of a position detection signal in accordance with a position detection result of a motor rotor, outputting a signal for controlling of each phase in synchronization with a rising and falling edge of the position detection signal, and varying and outputting a duty rate of a pulse width modulation signal from the moment that a falling edge of the position detection signal is detected.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
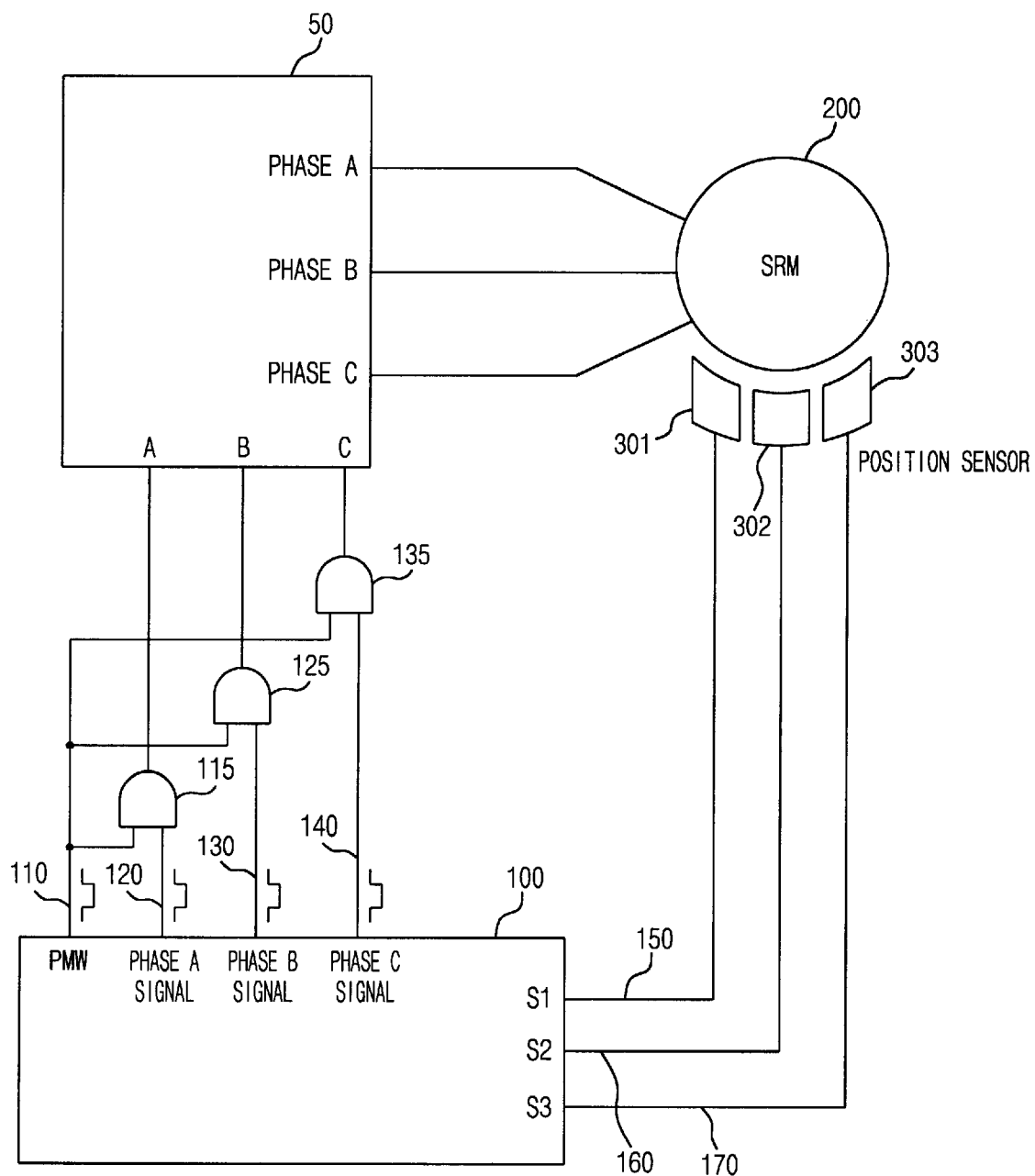
FIG. 1 is a block diagram showing a motor in accordance with the conventional art.
Figure 2:
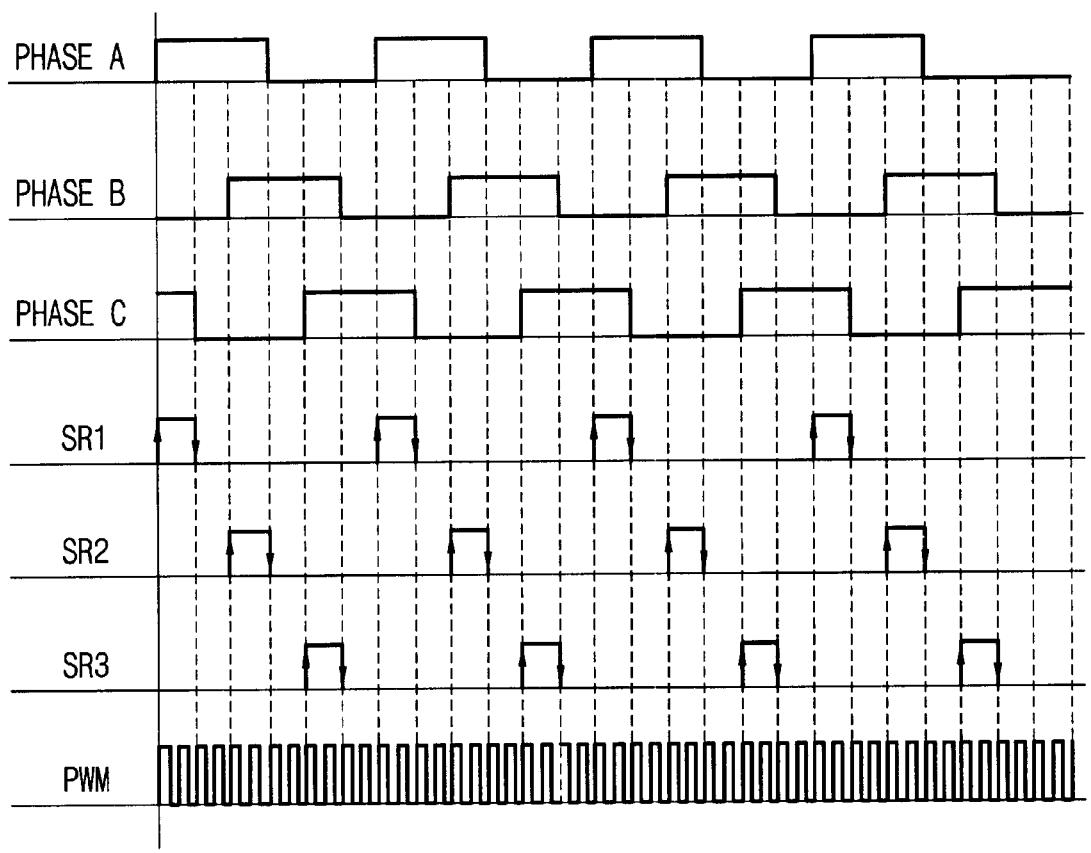
FIG. 2 shows respective wave form charts of three phases driving, sensor and pulse width modulation of the motor in accordance with the conventional art.
Figure 3:
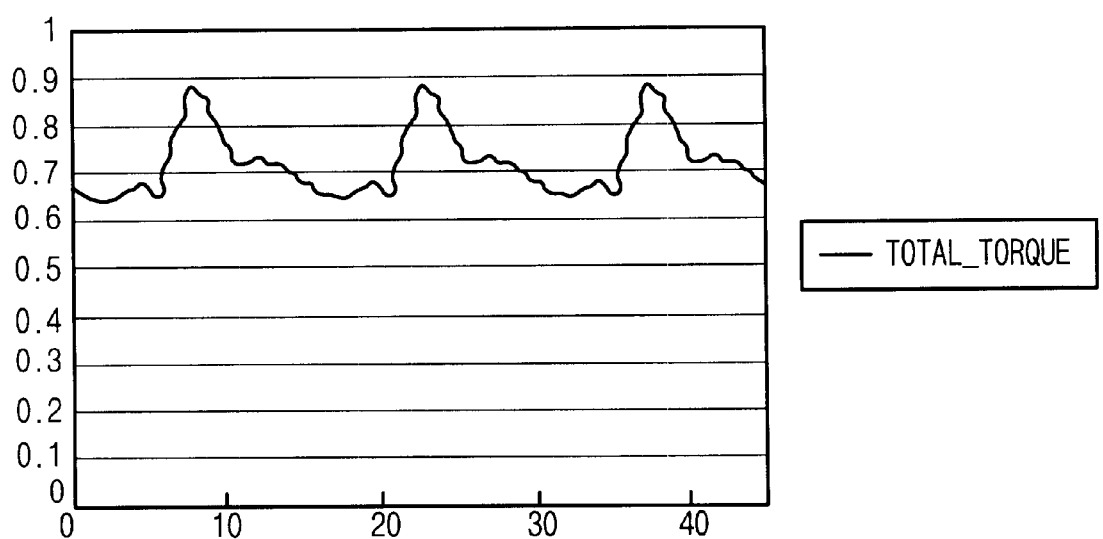
FIG. 3 is a wave form chart of a torque ripple in accordance with the conventional art.
Figure 4:
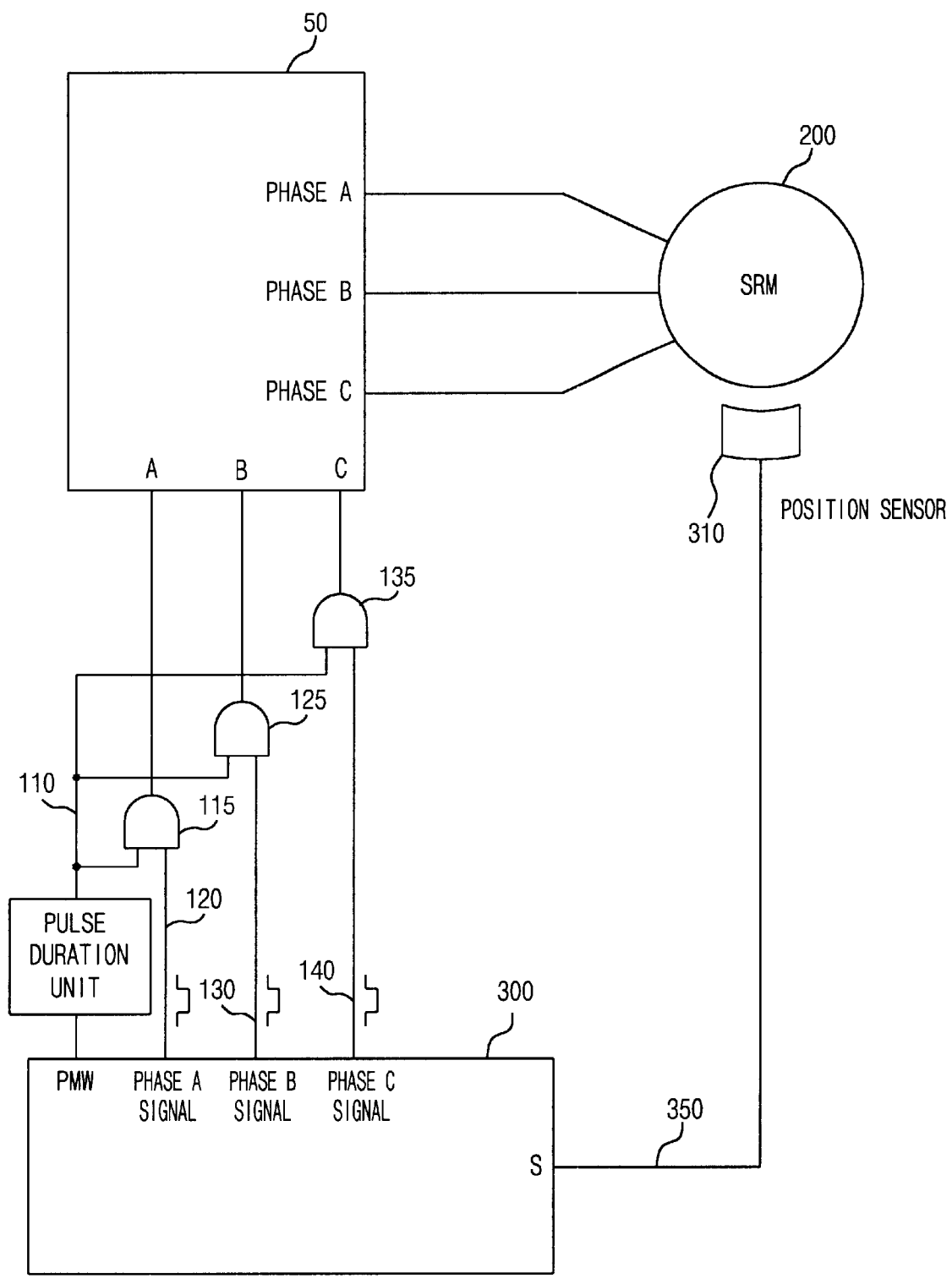
FIG. 4 is a block diagram of a motor in accordance with the present invention.

FIG. 4 is a block diagram of a motor in accordance with the present invention. As shown in the drawing, a motor in accordance with the present invention is comprised of a position detection sensor 310 for detecting position of a motor rotor, pulse width modulation signal 110, a main controlling unit 300 for controlling a pulse width modulation signal and three phase signal, a pulse duty rate controlling unit 400 for controlling a duty rate of a pulse width modulation signal in accordance with a position detection signal detected in the position detection sensor, a motor driving unit 50 for inputting three phases electric current to the motor by the three phase signal inputted from the main controlling unit 300 and a motor 200 driven by the three phase electric current inputted from the motor driving unit 50. Reference numerals 115, 125 and 135 designate end gates.

Figure 5:
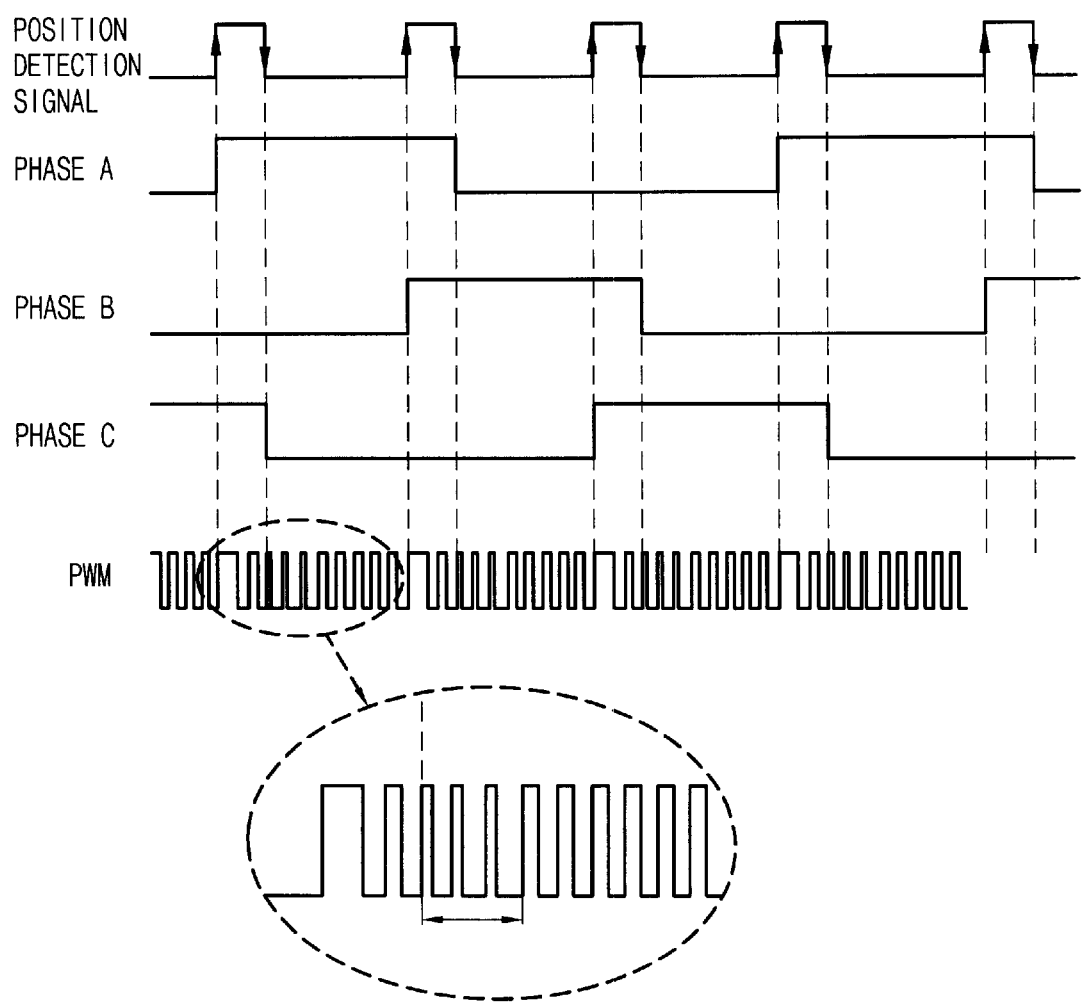
FIG. 5 is a wave form chart illustrating three phases driving, sensor and pulse width modulation of the motor in accordance with the present invention.

FIG. 5 is a wave form chart of respective signals outputted in FIG. 4.

Figure 6:
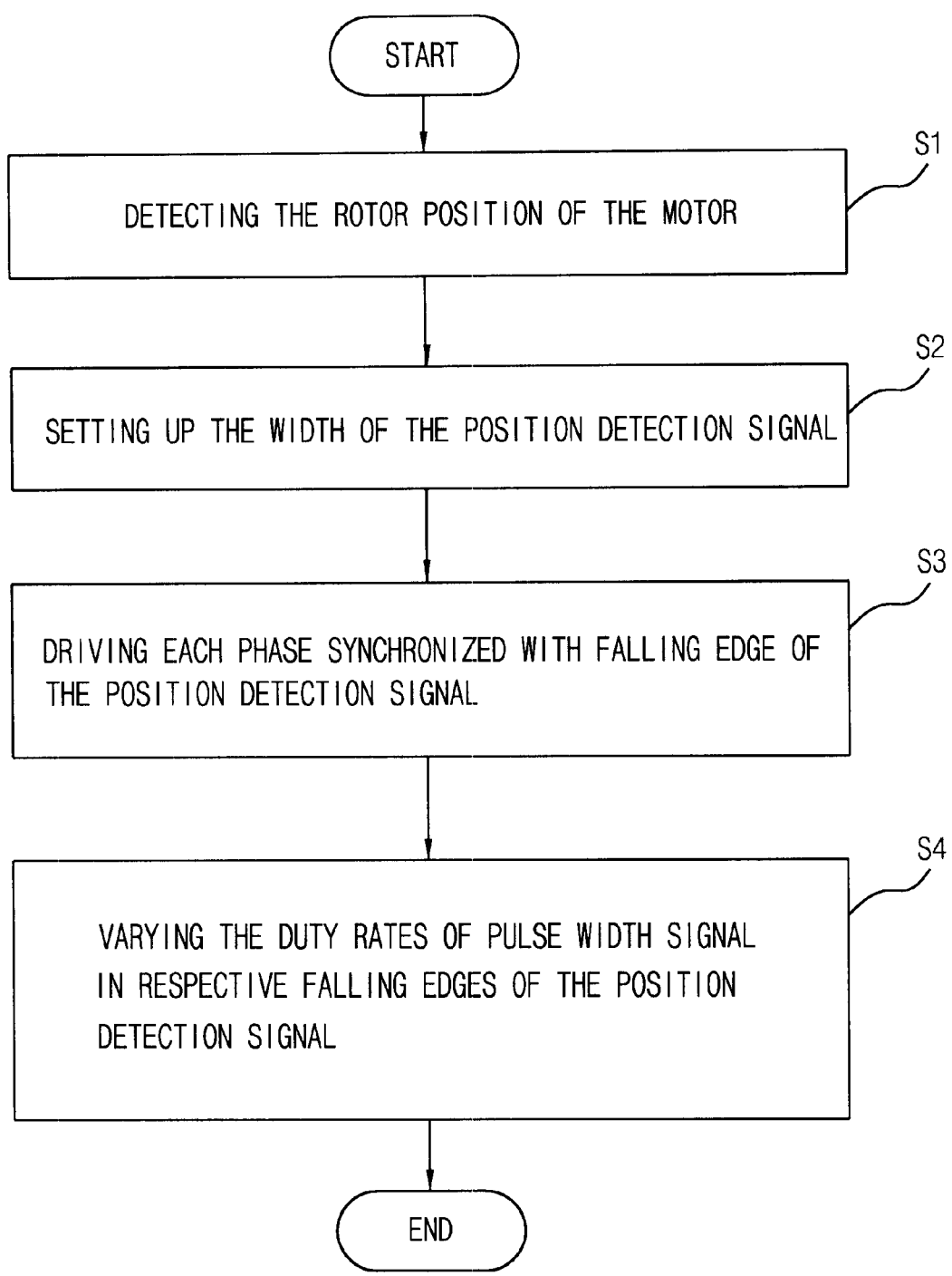
FIG. 6 is a flow chart to decrease a torque ripple of the motor in accordance with the present invention.

FIG. 6 is a flow chart to decrease a torque ripple of the motor in accordance with the present invention. With reference to FIGS. 4, 5 and 6, a method for decreasing a torque ripple of the motor will be described. The position detection sensor 310 detects rotor position of a motor and inputs a position detection signal 350 to the main controlling unit 300 S1.

According to the result of detection the rotor position of the motor, the main controlling unit 300 defines the pulse width of the position detection signal to be minimum value of the torque ripple S2.

At this time, an optimum result of the pulse width is generated when a rotational angle of a rotor is about six degrees. On the basis of the pulse width of the position detection sensor determined above, the main controlling unit 300 inputs the three phase signals 120, 130 and 140 to the motor driving unit in synchronization with a rising edge or falling edge of the position detection signal and the motor driving unit 50 inputs the three phase electric current to the motor 200 according to control of the signals.

Also, when the sensor 310 is turned on on the basis of the pulse width determined above, the rotor rotates a certain angle (six degrees) and the sensor 310 is turned off again. Later, the sensor 310 is turned on again after rotating a certain angle (nine degrees) more. With the above method, the turn on and off of the sensor is determined S3.

In addition, the pulse duty controlling unit 400 varies duty rates of the pulse width modulation signal in respective falling edges of the position detection signal 350, then performs a logical AND operation of the signals in each phase and the pulse width modulation signal 410 and inputs the result to the motor driving unit 50 S4.

Namely, when the sensor 310 is turned on at the first time, the A phase signal 120 becomes ON and the signal is inputted to the motor driving unit after performing a logical AND operation. The motor driving unit 50 inputs the A phase electric current to the motor 200 in accordance with control of the A phase signal 120 inputted in the main controlling unit 300 and accordingly, the sensor 310 rotates. At this time, the rotor rotates a certain angle (six degrees) more and the sensor is turned off. However, the motor 200 rotates continuously since the A phase signal 120 is still ON.

If the rotor rotates a certain angle (nine degrees) more, the sensor 310 is turned on again. In the moment that the position detection signal 350 is a rising edge, the B phase signal 130 becomes ON. The B phase signal is inputted to the motor driving unit 50 after performing a logical AND operation with the pulse width modulation signal 410. The motor driving unit 50 inputs the B phase electrical current according to control of the B phase signal 130 inputted in the main controlling unit 300 thus to drive the motor.

If the rotor rotates a certain angle (six degrees) again, The sensor 310 is turned off. In the moment that the position detection signal 350 is a falling edge, the A phase signal 120 becomes OFF. The A phase signal 120 is inputted to the motor driving unit 50 after performing a logical AND operation with a pulse width modulation signal 410. The motor driving unit 50 stops the A phase electric current inputted to the motor 200 by the signal. However, the motor rotor rotates continuously since the B phase signal is still ON.

Also, if the rotor rotates a certain angle (nine degrees) more, the sensor is turned on. In the moment that the position signal 350 is a rising edge, the C phase signal 140 becomes ON. The signal is inputted to the motor driving unit 50 after performing a logical AND operation with the pulse width modulation signal 410. Then the motor driving unit 50 inputs the C phase electric current to the motor 200.

Also, if the rotor rotates a certain angle (six degrees) more, the sensor 310 is turned off. In the moment that the B phase signal 130 is inputted to the motor driving unit after a logical AND operation with the pulse width modulation signal 410. By control of the signal, the motor driving unit 50 stops input of the B phase electric current inputted to the motor 200.

Also, if the rotor rotates a certain angle (nine degrees), the sensor 310 is turned on. In the moment that the position detection signal is a rising edge, the A phase signal 120 becomes ON. The A phase signal 120 is inputted to the motor driving unit 50 after a logical AND operation with the pulse width modulation signal 410 and the motor driving unit 50 inputs the A phase electric current 120 to the motor.

Later, if the rotor rotates a certain angle (six degrees), the sensor 310 is turned off and at the moment that the position detection signal 350 is a falling edge, the C phase signal 140 becomes OFF. The C phase signal 140 is inputted to the motor driving unit 50 after performing a logical AND operation with the pulse width modulation signal 410. By control of the signal, the motor driving unit 50 stops the input of the C phase electric current inputted to the motor.

With the above method, respective phases electric currents 120, 130 and 140 inputted to the motor 200 can be controlled using one position detection sensor 310.

In the main controlling unit 300, a Bipolar Junction Transistor (BJT) is used to adjust the turn on and off but another switching devices (for example, Metal Oxide Semiconductor Field Effect Transistor (MOSFET) and MOS gate Bipolar Transistor (MBT)) can be used.

The duty rate of the pulse width modulation signal changes the duty rate if the position detection signal 350 is detected as a falling edge decreasing the duty rate from the moment for several seconds and then increasing gradually again. Namely, if the pulse width of the pulse width modulation signal 410 is reduced to the half, for about 600 $\mu$s after the detection of the falling edge of the sensor detection signal. Also, after 600 $\mu$s, the pulse width becomes again as usual.

Then, a torque which is a sum of torques of each phase, which is generated by electric current inputted to respective phases and a torque ripple is generated.

Figure 7:
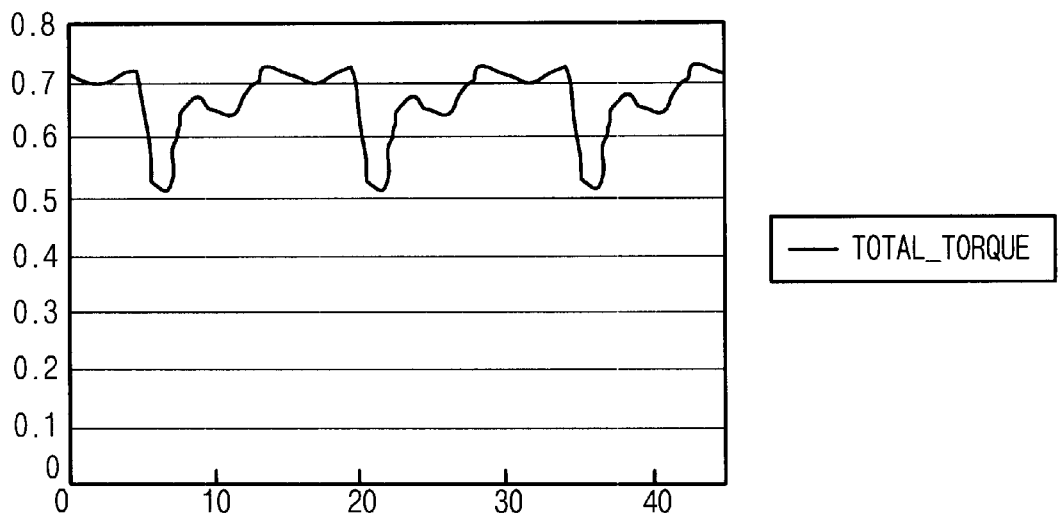
FIG. 7 is a wave form chart showing the torque ripple generated before controlling a duty rate of a pulse width modulation signal in the optimum condition of the pulse width of a position detection signal in accordance with the present invention.

FIG. 7 is a wave form chart showing the torque ripple generated before controlling a duty rate of a pulse width modulation signal in the optimum condition of the pulse width of a position detection signal in accordance with the present invention. Here, the horizontal axis designates a rotational angle and the vertical axis designates strength of the torque. As shown in the drawing, the torque ripple in the present invention has little difference with a conventional torque ripple.

Figure 8:
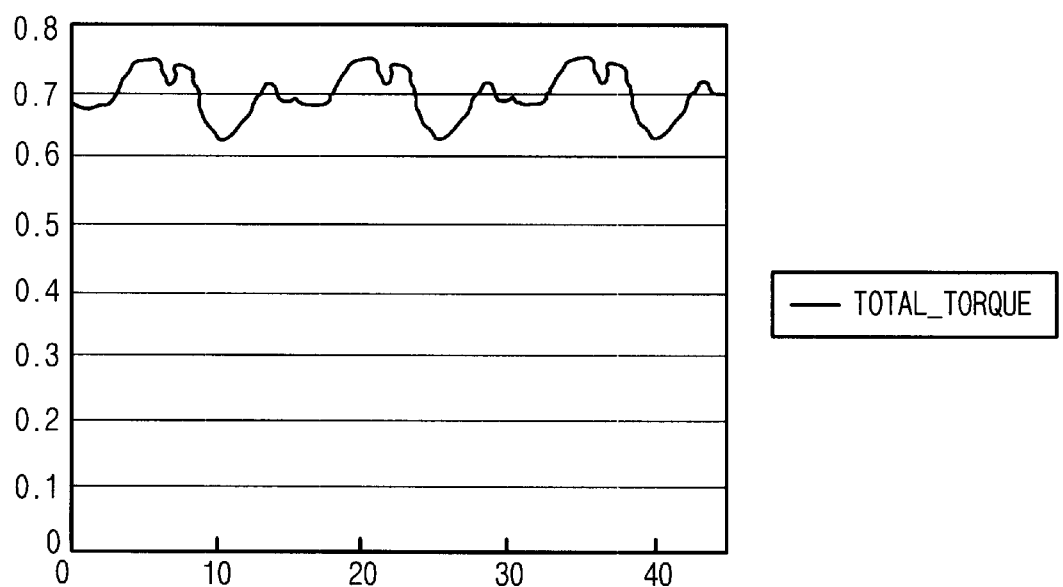
FIG. 8 is a wave form chart showing the torque ripple generated after controlling a duty rate of a pulse width modulation signal in the optimum condition of the pulse width of a position detection signal in accordance with the present invention.

FIG. 8 is a wave form chart showing the torque ripple generated after controlling a duty rate of a pulse width modulation signal in the optimum condition of the pulse width of a position detection signal in accordance with the present invention. Here, the horizontal axis designates a rotational angle and the vertical axis designates strength of the torque. As shown in the drawing, by setting an optimum machine angle and controlling the duty rate, about fifty percents of torque ripple is decreased.

As shown above, by designing the width of the position detection signal of the rotor detected using one position detection sensor 310 as an optimum one, the duty rate of the pulse width modulation signal for driving the switch device is changed for a certain time from the moment that the position detection signal 350 is a falling edge thus to reduce more than fifty percent of the torque ripple.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the meets and bounds of the claims, or equivalence of such meets and bounds are therefore intended to be embraced by the appended claims.

What is claimed is:

1. A method for reducing a torque ripple of a Switched Reluctance Motor (SRM) comprising the steps of:

setting a pulse width of a position detection signal in accordance with a position detection result of a motor rotor;

outputting a signal for controlling of each phase in synchronization with a rising and falling edge of the position detection signal; and varying and outputting a duty rate of a pulse width modulation signal from the moment that a falling edge of the position detection signal is detected.

2. The method of claim 1, wherein the pulse period of the position detection signal is set having as much time period during which the motor rotor rotates fifteen degrees of a mechnical angle.

3. The method of claim 2, wherein a high level pulse width of the pulse period is set having as much time period during which the motor rotor rotates six degrees of machine angle.

4. The method of claim 1, wherein the step of controlling the three phase electric current is that operated by turning on a switching device for controlling current of each phase in case a rising edge of the position detection signal is detected and then turning off the switching device to a falling edge of the position detection signal generated at the next time.

5. The method of claim 1, wherein the duty rate of the pulse width modulation signal is reduced to the half from the moment that a falling edge of the position detection signal is detected at each period and again increases gradually.

* * * * *